United States Patent
Ly et al.

(10) Patent No.: US 11,356,350 B2
(45) Date of Patent: *Jun. 7, 2022

(54) INTERNET OF THINGS EVENT MANAGEMENT SYSTEMS AND METHODS

(71) Applicant: CONVIDA WIRELESS, LLC, Wilmington, DE (US)

(72) Inventors: Quang Ly, North Wales, PA (US); Lijun Dong, San Diego, CA (US); Dale N. Seed, Allentown, PA (US); Shamim Akbar Rahman, Cote St. Luc (CA)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,887

(22) Filed: Feb. 24, 2021

(65) Prior Publication Data

US 2021/0203579 A1 Jul. 1, 2021

Related U.S. Application Data

(63) Continuation of application No. 14/472,553, filed on Aug. 29, 2014, now Pat. No. 10,958,552, which is a (Continued)

(51) Int. Cl.
*H04L 43/0876* (2022.01)
*H04W 4/40* (2018.01)
(Continued)

(52) U.S. Cl.
CPC ......... *H04L 43/0876* (2013.01); *H04L 67/10* (2013.01); *H04L 67/125* (2013.01);
(Continued)

(58) Field of Classification Search
CPC ..... H04L 12/26; H04L 29/08; H04L 43/0876; H04L 67/10; H04L 67/26; H04L 67/125; H04W 4/006
(Continued)

(56) References Cited

U.S. PATENT DOCUMENTS

2004/0133896 A1* 7/2004 Lym ............... H04L 12/282
719/315
2005/0270151 A1* 12/2005 Winick ............ H04L 12/2818
340/539.1
(Continued)

FOREIGN PATENT DOCUMENTS

CN 102420862 A 4/2012
CN 102523200 A 6/2012
(Continued)

OTHER PUBLICATIONS

Case et al, "A Simple Network Management Protocol (SNMP)", RFC1157, May 1990, 31 pages.
(Continued)

*Primary Examiner* — Tauqir Hussain
(74) *Attorney, Agent, or Firm* — BakerHostetler LLP

(57) ABSTRACT

Internet of Things (IoT) event objects can be tailored to specific device types and capabilities. An IoT event object can use a flexible definition of an event that can be reconfigured. An IoT event object allows for the ability to set different triggering conditions and priorities. Individual event definitions can be extended to create more complex events. A Notification Handler supports sending a request or command in response to an event that requires action.

20 Claims, 13 Drawing Sheets

Related U.S. Application Data continuation of application No. 61/871,474, filed on Aug. 29, 2013.

(51) Int. Cl.

| | | |
|---|---|---|
| *H04L 67/10* | (2022.01) | |
| *H04W 4/38* | (2018.01) | |
| *H04L 67/55* | (2022.01) | |
| *H04L 67/125* | (2022.01) | |
| *H04W 4/70* | (2018.01) | |
| *H04W 4/50* | (2018.01) | |
| *H04L 67/12* | (2022.01) | |

(52) U.S. Cl.
 CPC ............... *H04L 67/26* (2013.01); *H04W 4/38* (2018.02); *H04W 4/70* (2018.02); *H04L 67/12* (2013.01); *H04W 4/50* (2018.02)

(58) Field of Classification Search
 USPC ........................................................ 709/224
 See application file for complete search history.

(56) References Cited

U.S. PATENT DOCUMENTS

| | | | | |
|---|---|---|---|---|
| 2006/0094400 | A1* | 5/2006 | Beachem | H04M 7/121 455/410 |
| 2007/0123268 | A1 | 5/2007 | Parata | |
| 2011/0060812 | A1* | 3/2011 | Middleton | G06F 16/9574 709/219 |
| 2011/0090837 | A1* | 4/2011 | Duchscher | H04L 1/0057 370/312 |
| 2011/0200052 | A1* | 8/2011 | Mungo | H04L 41/028 370/401 |
| 2011/0213871 | A1* | 9/2011 | DiGirolamo | H04W 4/70 709/223 |
| 2013/0151708 | A1* | 6/2013 | Shelby | H04L 65/40 709/226 |
| 2014/0359131 | A1* | 12/2014 | Seed | H04L 67/1031 709/226 |
| 2015/0006296 | A1* | 1/2015 | Gupta | G06Q 30/0269 705/14.66 |
| 2015/0029894 | A1* | 1/2015 | Lu | H04L 12/1407 370/259 |
| 2015/0319038 | A1* | 11/2015 | Spencer | G06Q 10/06 370/254 |
| 2015/0341446 | A1* | 11/2015 | Nguyen | H04L 67/16 709/223 |
| 2015/0381776 | A1* | 12/2015 | Seed | H04L 67/16 709/203 |
| 2016/0085594 | A1* | 3/2016 | Wang | H04L 67/12 709/226 |
| 2016/0157276 | A1* | 6/2016 | Kim | H04W 76/10 455/450 |
| 2017/0164187 | A1 | 6/2017 | Lu | |
| 2017/0272316 | A1* | 9/2017 | Johnson | G06Q 10/103 |
| 2017/0311304 | A1 | 10/2017 | Lu | |
| 2018/0027360 | A1* | 1/2018 | Shaw | H04W 12/08 455/411 |
| 2019/0327135 | A1* | 10/2019 | Johnson | H04L 67/34 |

FOREIGN PATENT DOCUMENTS

| | | |
|---|---|---|
| EP | 1793559 A2 | 6/2007 |
| JP | 2007-157149 A | 6/2007 |
| KR | 10-2013-0037199 A | 4/2013 |
| WO | 2009/079036 A1 | 6/2009 |

OTHER PUBLICATIONS

European Telecommunications Standards Institute (ETSI), TS 102 690, VI.2.1, Machine-to Machine communications (M2M); Functional architecture, Jun. 2013, 279 pages.

Hartke, K. "Observing Resources in CoAP", draft-ietf-core-observe-07, Oct. 22, 2012, 28 pages.

http://en.wikipiedia.org/wiki/File:SNMP communication principles diagram.PNG, Jan. 2006.

http://member.openmobilealliance.org/ftp/publicdocuments/dm/LightweightM2M/2013/OMA-DM-LightweightM2M-2013-0036-CR Information Reporting Update, Mar. 2013, 10 pages.

International Application No. PCT/US2014/053399: International Search Report and Written Opinion dated Nov. 20, 2014, 9 pages.

Japan Patent Application No. 2016-537891: Notice of Reasons for Rejection dated May 29, 2017, 5 pages.

Kato et al,"The Cooperative System using Heterogeneous Devices", Study Report of Information Processing Society of Japan, Heisei-21, 2009, 6, Japan; Information Processing Society of Japan, Apr. 15, 2010, 2010-UBI-25, 22, 1-6 (English Abstract on first page).

Rose, M. "A Convention for Defining Traps for use with the SNMP", RFC 1215, Mar. 1991, 7 pages.

Takada et al, "A Temporal Object Model with Valid Interfal Based Temporal Validity and its Applications", Technical Study Report of The Institute of Electronics, Information and communication Engineers, Jul. 25, 1996, 96(176), 67-72 (English Abstract on first page).

\* cited by examiner

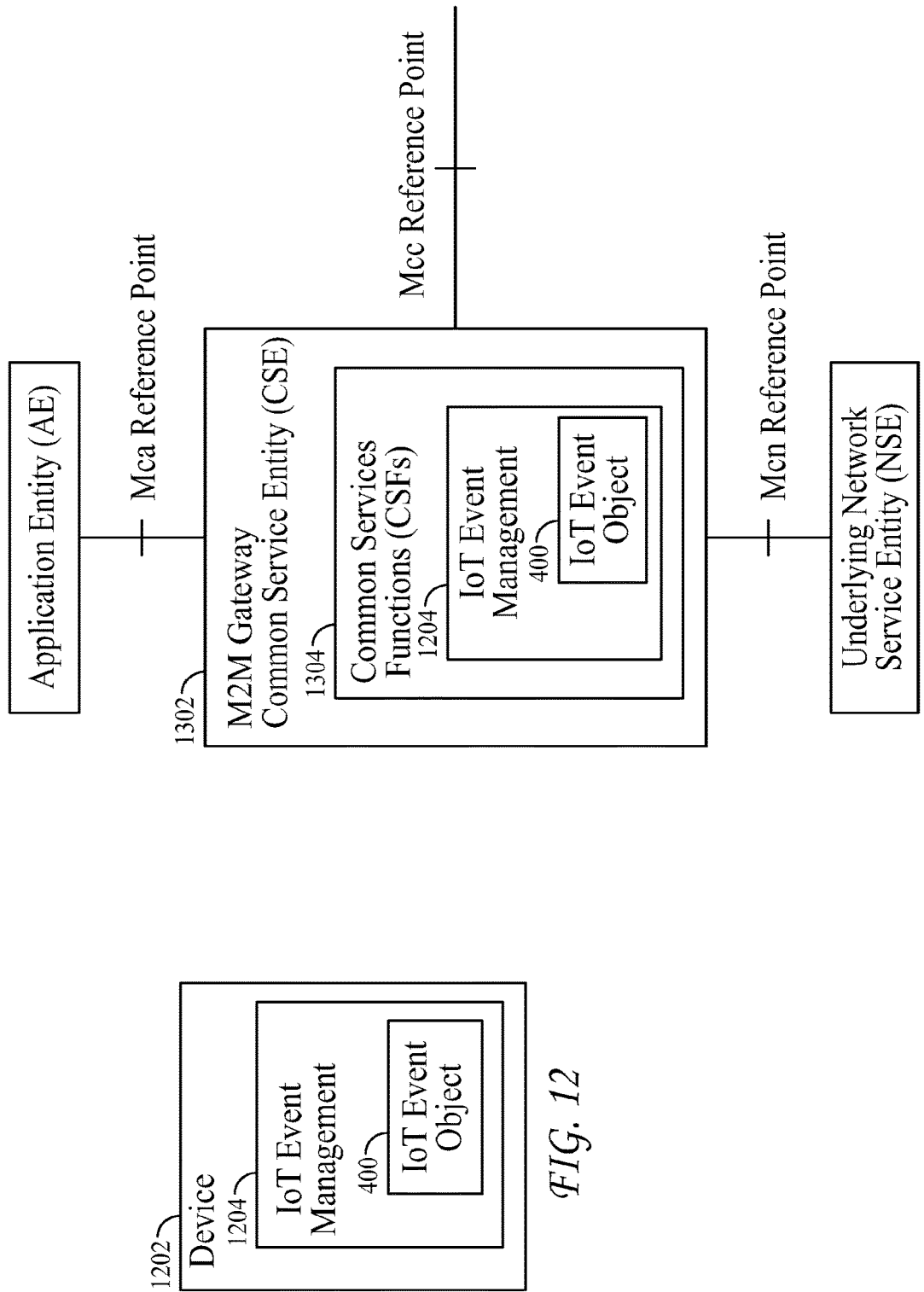

INTERNET OF THINGS EVENT MANAGEMENT SYSTEMS AND METHODS

CROSS-REFERENCE TO RELATED APPLICATIONS

This application is a Continuation of U.S. patent application Ser. No. 14/472,553, filed Aug. 29, 2014, which claims the benefit of U.S. Provisional Patent Application Ser. No. 61/871,474, filed Aug. 29, 2013, the disclosures of which are hereby incorporated by reference as if set forth in their entireties.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate over a network, such as the Internet. IoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold. As will be appreciated, the IoT has the potential to include many millions of devices. Relating data from the devices in the IoT to meaningful events is an important aspect of increasing the functionality of IoT systems.

SUMMARY

Disclosed herein are methods, devices, and systems related to event management for Internet of Things (IoT) devices. IoT event objects may be generated that are tailored to specific device types and capabilities. Such event objects may use a flexible definition of an event that can be reconfigured. An IoT event object may also include varying triggering conditions and priorities that can also be reconfigured. Individual event definitions may be extended to create more complex events. A Notification Handler may support sending a request or command in response to an event that requires action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 12 is a diagram of an exemplary device that implements IoT Event Management with an IoT Event Object.

FIG. 13 is a diagram of an exemplary oneM2M embodiment with IoT event management including an IoT Event object hosted in a CSE as an oneM2M CSF.

DETAILED DESCRIPTION OF ILLUSTRATIVE EMBODIMENTS

In a diverse and large system such as the Internet of Things (IoT), monitoring the potentially billions of devices within the system may assist in ensuring proper operation of the entire system. These "Things" in the IoT may be of various types and capabilities and may provide a variety of data in various formats. To make the best use of the IoT, data supplied by these Things may be related to "events" to allow better use of such data. Using events allows for more efficient operation of the network and improved use of resources. For example, network traffic may be reduced if a smart temperature sensor reports a measurement only if the current temperature passes a certain threshold rather than providing periodic measurements. In a controlled environment, temperature fluctuations may be minor and a smart sensor may generate much less traffic than a non-smart sensor that periodically reports measurements.

Events may include data from different devices that may be used to create new, smarter applications that are more automated. The mechanism to define, create, configure, and manage "IoT Events" may be referred to as "IoT Event Management." For example, combining the smart temperature sensor of the previous example with a presence sensor may enable the control of a HVAC system only if someone is in the room. In addition, if weather forecast data is also used, the HVAC system may intelligently operate to anticipate the need to turn on or otherwise operate as appropriate.

A mechanism that may be used in some embodiments may be referred to as "trap events", which are conditional events programmed into a device's operations that, when triggered, provide a notification to a "Manager" device. The Manager may respond accordingly depending on the information provided in the notification message.

Figure 1:
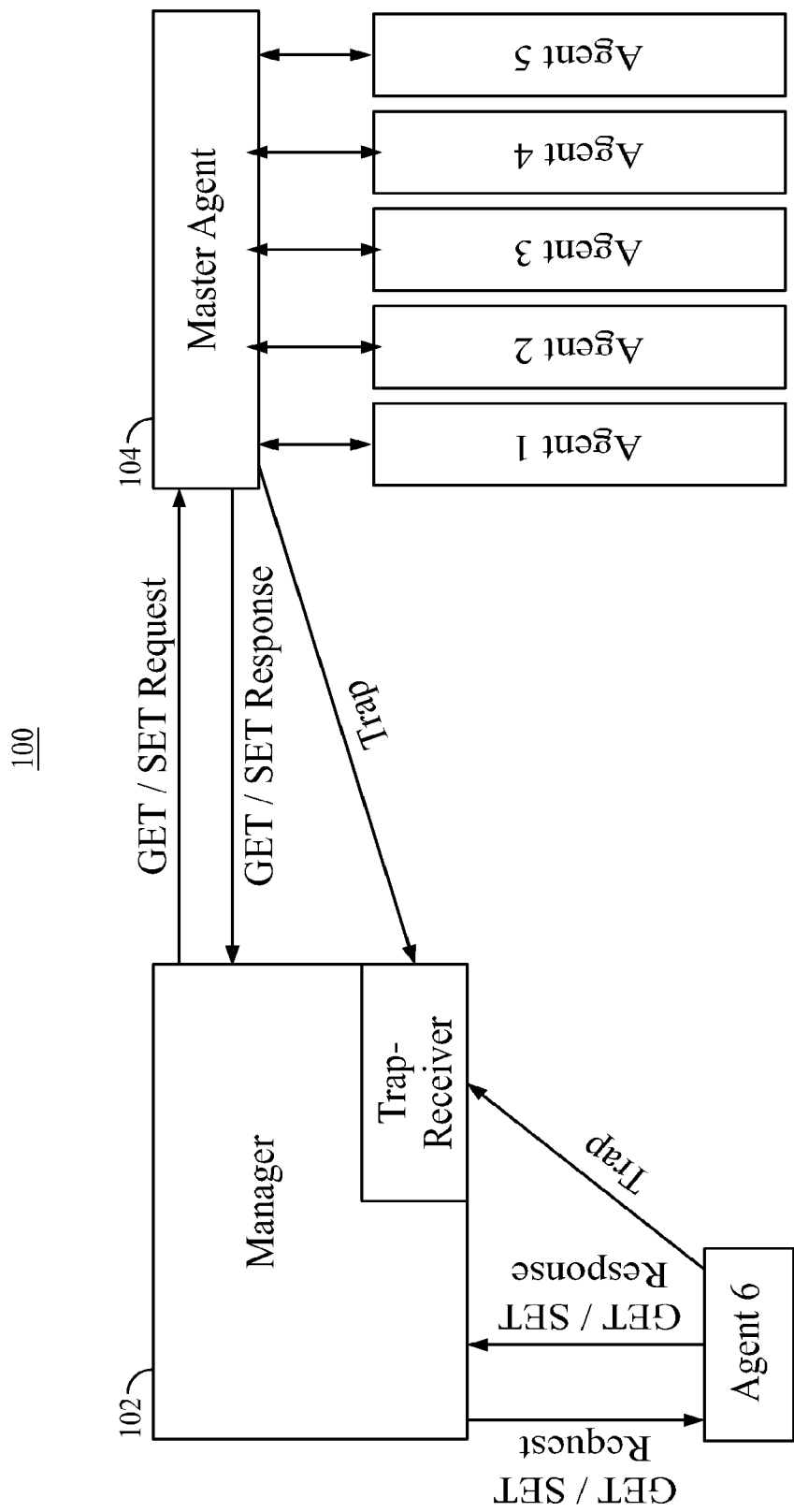
FIG. 1 is a diagram of a Simple Network Management Protocol (SNMP) system.

Trap events have been used to manage computer networks, for example, in the Simple Network Management Protocol (SNMP). SNMP defines a centrally located Manager 102 that monitors and manages a group of managed devices on a computer network as shown in FIG. 1 as architecture 100. A SNMP Manager 102 may configure devices, monitor performance, and detect fault conditions. The mechanism provided in SNMP to detect fault conditions uses trap events. When a fault condition occurs on a device, a trap message may be generated with information about the fault and sent to the Manager 102. The Manager 102 in turn may process the trap message and respond accordingly. Example trap events include the restart or shutdown of a device, the detection of a link failure in the network, or an inappropriate access.

SNMP software that runs on a device may be referred to as an "Agent" 104 while the software that runs on the Manager 102 may be referred to as a Network Management System or NMS. The Agent 104 may implement one of several defined trap events. The defined trap events may be referred to collectively as Generic Trap Events and may include events labeled coldStart, warmStart, linkDown, linkUp, authenticationFailure, and egpNeighborLoss. In addition to generic traps, enterprise-specific traps may also be defined. Such traps may provide enterprises the ability to define custom traps that their devices support in addition to the generic traps.

The design and implementation of trap events may be performed during the development of software for devices. As a result, trap events may be part of the application code and may not be able to be changed or configured once the device is deployed and/or executing the code. Because of this, each trap event may be limited to the particular applications for which it was originally designed.

Figure 2:
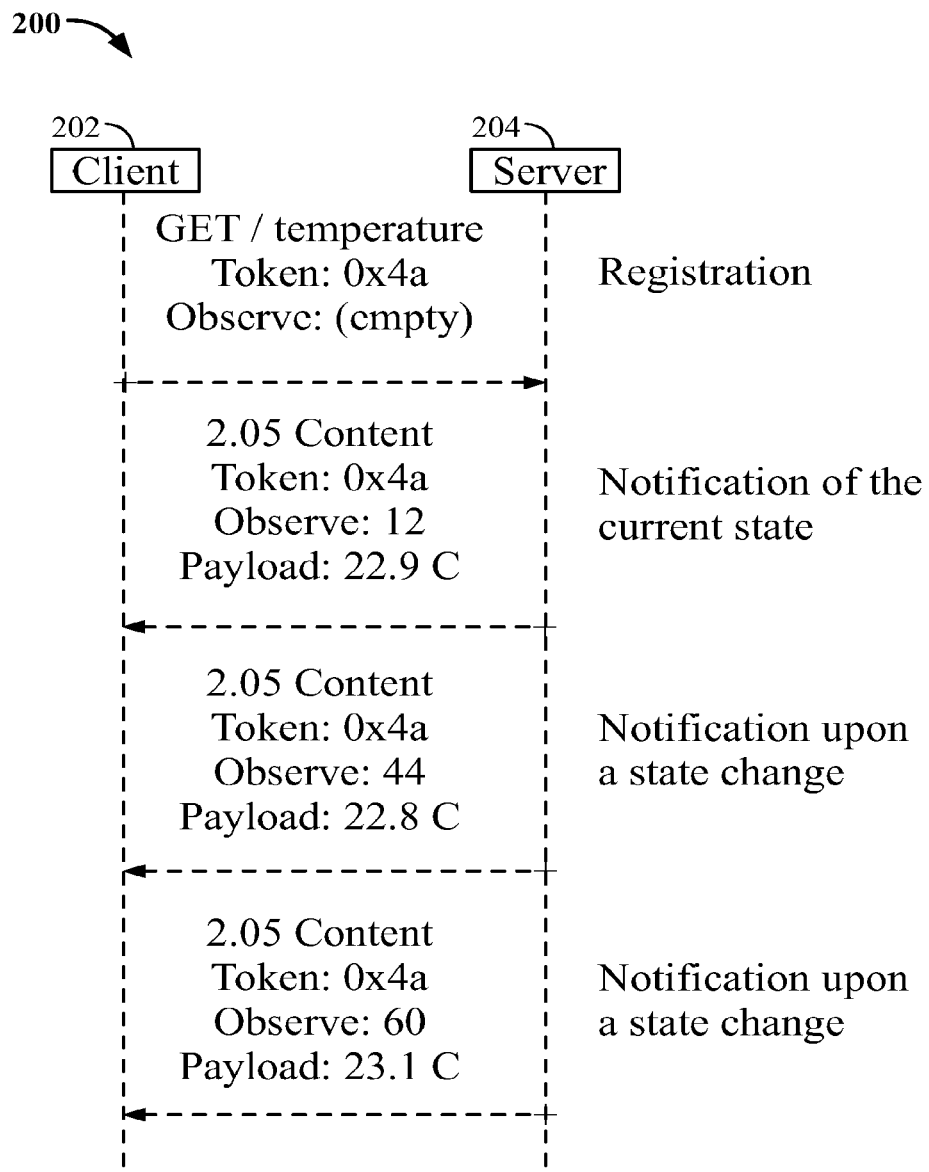
FIG. 2 is a signal flow diagram that illustrates a CoAP Observe feature.

Functionality similar to that of trap events may be found in the Constrained Application Protocol (CoAP) Observe feature. This feature may provide clients an ability to observe resources in a device, such as a server, and provide updates regarding such resources over a period of time. FIG. 2 is a diagram that illustrates a signal flow 200 showing how the CoAP Observe feature may operate. A client 202 may perform a GET of an observable resource on a server 204. The server may respond with a current state of that resource. When a change occurs in the observable resource, another notification may be sent to the client automatically with the new state. Additional notifications may be sent to the client 202 until the CoAP Observe request is cancelled.

The CoAP Observe feature may be expanded to filter notifications sent to a client 202. New parameters may be included for the Observe operation to provide more selective notifications. With such new parameters (which may be named according to their function such as "Greater Than", "Less Than", and "Step"), a client may request to receive notifications only if the observable resource passes the threshold associated with the parameter. In some embodiments, the resource to which the parameter may be applied may be required to be of numerical type.

Figure 3:
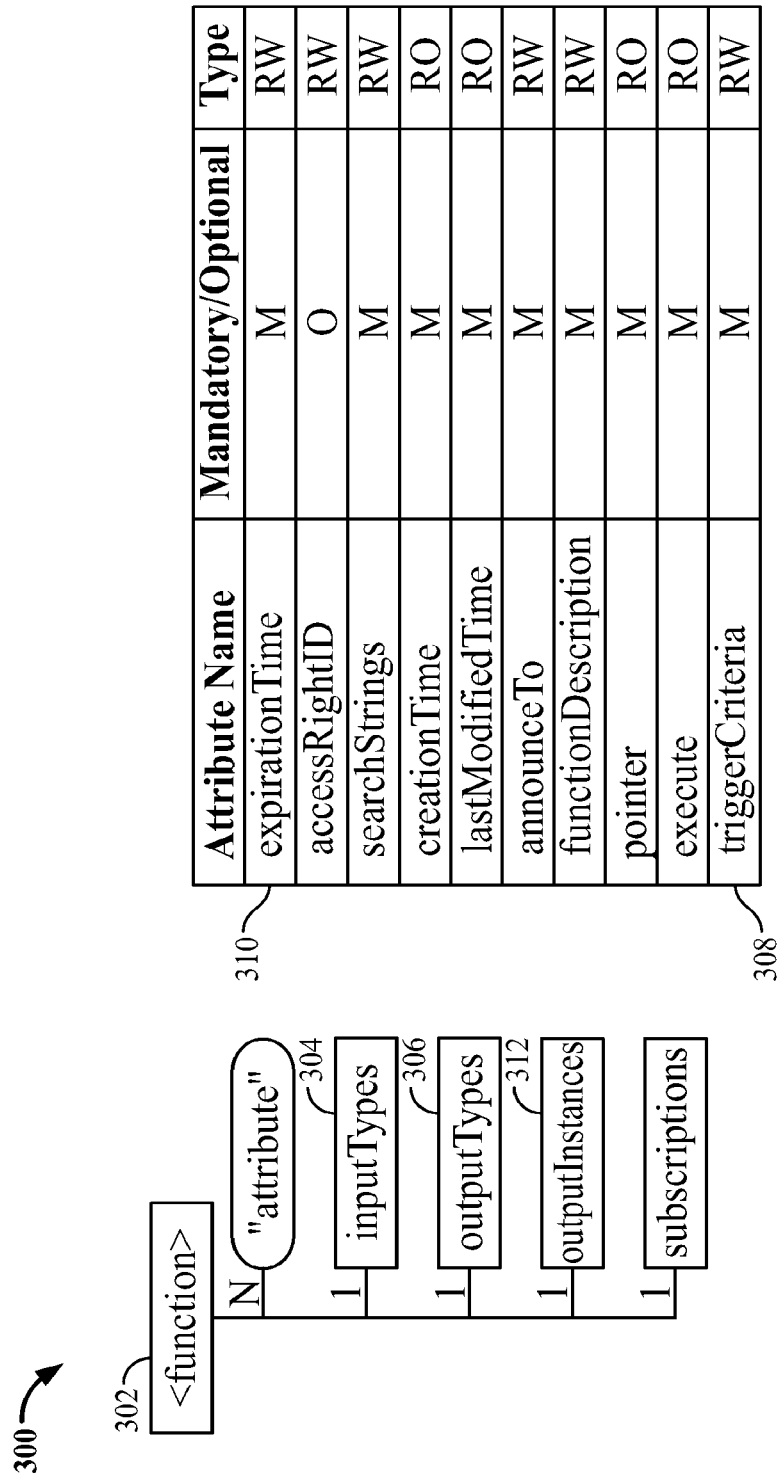
FIG. 3 is a diagram that illustrates a function resource at the Application Service Layer.

In an embodiment, a definition of a function resource at the Application Service Layer, as shown in structure 300 of FIG. 3, may support the implementation of trap events. Trap events may be created as a "<function>" resource 302 with "inputTypes" 304 and "outputTypes" 306 sub-resources that may provide the parameter type associated with the inputs and outputs of the function. The table of FIG. 3 shows some of the attributes for structure 300. The service layer may autonomously invoke a function based on a triggering condition defined by the "triggerCriteria" attribute 308. Types of triggerCriteria 308 may include one or more create, retrieve, update, delete (CRUD) operations upon a specified resource or hierarchy of resources, system events such as running low on memory resources and detection of a security threat, and detection of a specific M2M operation such as the reaching of an "expirationTime" 310 of a resource, modification of a resource, "accessRights" modification, etc. Alternatively, a function may be triggered on demand by updating the execute attribute. The output of the function may be stored in the "outputInstances" sub-resource 312. No more notification handling may be provided as part of the function's operation.

Current implementations of trap events are fixed, inflexible, hidden, or not portable to IoT devices. With the deployment of potentially billions of devices in an IoT system, it is important to provide mechanisms such as those set forth herein that allow for targeted notification handling based on customizable, functional events. Any such mechanism should be flexible, portable, transparent, and extensible.

SNMP trap events may be created in custom code that is compiled with the operational code of the device. The code, when triggered, calls an SNMP Agent to generate a trap event that is sent to the Manager. An end user may not have visibility into the conditions that triggered the trap event. Additionally, there may be no mechanism to reconfigure or extend the trap event dynamically once the device is deployed without writing and installing new code on the device.

The CoAP Observe feature provides an ability to define a trap event based on changes to the state of an observable resource. Similar to SNMP, the condition that triggers the trap event may not be visible to the end user once the GET request completes. In addition, the observe request is not configurable nor is it extensible after the observe event is created.

In an embodiment, a mechanism is used in which a function may be created to support trap events. Such a function may be autonomously triggered by a service layer or through a "RESTful" request to update the "execute" attribute of the function resource. Functions such as these may rely on a service layer to trigger the trap event and provide the outputs as resources in the service layer. No further notification handling may be provided. The trap event in this embodiment may be hosted in the service layer so devices without a service layer may not have the capability to support trap events.

All three of these implementations provide certain features of trap events but none are fully suitable for IoT devices. In order to efficiently provide IoT devices with trap event capabilities, existing trap event implementations need to be improved for flexibility, portability, transparency, and extensibility.

In an embodiment, an IoT Event Object 400 is generated that may be targeted to IoT devices and gateways but may also exist in a server running a service layer as well. The features of such an IoT Event Object 400 may include tailoring the Event Object 400 to IoT devices and gateways that have different capabilities and resources while providing a consistent interface for creating events. IoT Event Object 400 can allow for the flexible and reconfigurable defining of an event while providing for the ability to set different triggering conditions and priorities. Individual event definitions 402 may be extended to create more complex events. A Notification Handler 404 may support sending a request or command in response to an event that requires action. The disclosed IoT Event Object 400 can provide a portable and transparent way of specifying events that IoT devices and gateways may implement. The disclosed IoT Event Object 400 may reduce network traffic by providing desired information that may enable more intelligent operation of the IoT system. In addition, the disclosed IoT Event Object 400 may simplify application logic by providing the capabilities within the object or on a service layer.

Figure 4:
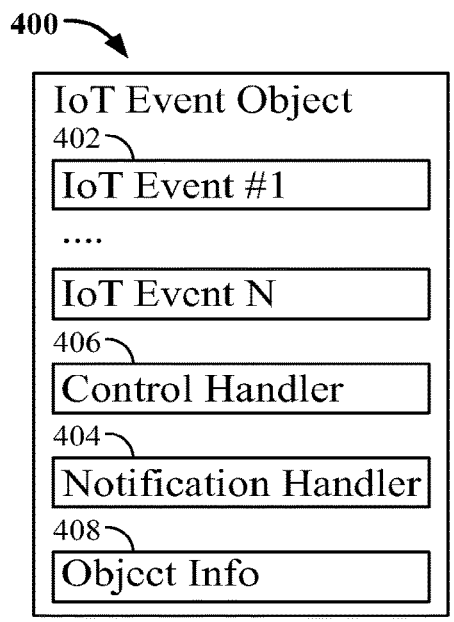
FIG. 4 is a diagram of an exemplary IoT Event Object.

In an embodiment, an IoT Event Object 400 may contain all the functionality to implement trap events. Such an IoT Event Object 400 may contain mechanisms that define and create events, define trigger and control conditions, provide the underlying logic for evaluating events, allow the ability to reconfigure and extend events, and provide for several notification handling options. FIG. 4 shows structure 400 of an exemplary, non-limiting IoT Event Object 400. In this example, IoT Event Object 400 contains the IoT Event Definitions 402, the Control handler 406, Notification Handler 404, and the Object Info resources 408.

Figure 5:
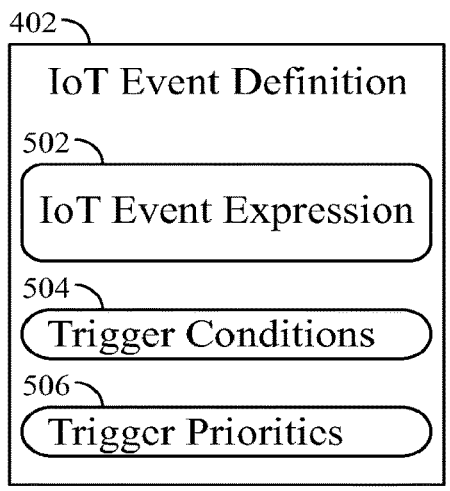
FIG. 5 is a diagram of an exemplary IoT Event Definition.

As shown in FIG. 4, the IoT Event Object 400 may contain up to N individual event definitions 402. As shown in FIG. 5, each event definition 402 may consist of an event expression 502 and the associated trigger conditions 504 and trigger priorities 506. One or more events may be combined to create more complex events by a Control Handler 406. As a result, each event may be first independently defined and may later be extended to create more complex events as the need arises. This offers flexibility in defining the event but allows for extensibility of the event definitions in the future.

An event definition's event expression, such as the event expression shown as part of exemplary non-limiting event definition 402 in FIG. 5, may define the conditions that cause the event. An event expression may be an algebraic expression, a custom function, a semantic expression (where the device supports semantic types), or any other type of function or expression. The expression may include one or more resources to be monitored and compared to a threshold. As such, operands, operators, and threshold values may be provided to form the definition.

An operand of an event expression may be an internal resource, an external resource, an output of some external function, or the output of another IoT event. For operators, arithmetic, logical, custom functions, or semantic keywords may be used. Thresholds may be any of the operand types described above as well as numerals, strings, and other complex types. Some non-limiting example event expressions are listed below:
- (pressure>32)—where pressure is a resource
- (temperature>90) and (humidity>75)—where temperature and humidity are resources
- (presence=1) and [(time>8:00) and (time<17:00)]—where presence and time are resources
- $\{f(t)=(speed(t-1)+speed(t))/elapsed\_time\}>(x)$—where speed and elapsed_time are resources; note that this is an example of a function being used in the IoT Event Expression; the function may be internally defined or externally defined and referenced by a Uniform Resource Identifier (URI)
- (GPS coordinates) in the area of 19406—where GPS coordinates and 19406 are resources; note this is an example of a semantic expression
- The average of (x) is less than (y)—where x and y are resources; note this is another example of a semantic expression For all resources specified in the event expression, the associated triggering conditions may specify how the event is evaluated. In an embodiment, a triggering mechanism may be a reference URI trigger that is supported by an underlying service layer and/or supported by a CoAP Observe Get request. In other embodiments, any of a subscription trigger, a timer based retrieve trigger, and an on demand retrieve trigger may be used.

A reference URI trigger may simply be a reference URI to a resource. There may be two sub-trigger mechanisms for this case, a trigger supported by the underlying service layer or trigger supported by a CoAP Observe request. In either case, an update of the resource may trigger the evaluation of the event expression.

If a resource is configured for subscription triggering, the IoT Event Object 400 may automatically create a subscription to the resource after the event is activated in the Control Handler. The subscription URI of the resource may be specified directly in the IoT Event Expression 502 or indirectly in the Trigger Conditions resource 504. The resulting notification generated from the subscription may then trigger the evaluation of the event.

Another way to trigger the evaluation of the event is to simply perform a retrieve of the resource. A timer can be used to periodically retrieve a resource value. Alternatively, a retrieve on demand may be executed when specified in the Control Handler 406. The response to the retrieve request will trigger the evaluation of the event.

For IoT Event Expressions 502 that contains multiple resources, a priority on which trigger conditions take precedence may be specified in the Trigger Priorities resource 506. In an embodiment, a priority may be assigned to each resource and only the resources whose trigger conditions 504 are listed may trigger the evaluation of the event. In another embodiment, there may be no priority assigned to any resources and the first trigger condition to occur triggers the evaluation of the event.

Once a triggering condition 504 occurs for a resource, the IoT Event Object 400 may retrieve the remaining resources before evaluating the event expression. If desired, a timer may be used to control how long the IoT Event Object 400 waits for responses to the retrieves. If all the responses are not received in time, then an Error Notification may be sent indicating the event was not executed.

Figure 6:
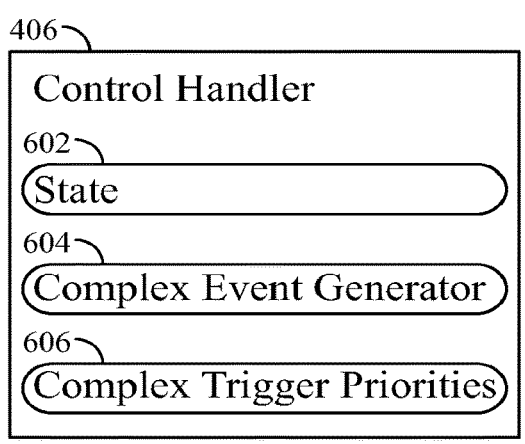
FIG. 6 is a diagram of an exemplary Control Handler.

Once the event expressions 502 and trigger conditions 504 are defined, state information may be specified to control how the event operates. A Control Handler 406, such as exemplary non-limiting Control Handler 406 of FIG. 6, may provide this functionality through the State resource 602. A resource may be in a state of "on, continuous", where the event operates continuously and notifications are sent whenever a trigger condition is met. A resource may be in a state of "on, occurrence based", where the event operates continuously for a number of occurrences specified. Once the number of occurrences has been met, a notification may be sent and the state changed to off. A resource may be in a state of "on, timer based", where the event operates continuously for a specified time interval and the state changes to off outside the time interval. Notifications may only be sent if the triggering conditions are met within the time interval. Any triggering conditions that occur outside the time interval may not generate a notification. A resource may be in a state of "off", where the event is not active and will not respond to any triggering conditions.

In addition to the state resource 602, the Control Handler 406 may also have a Complex Event Generator resource 604. This resource 604 may provide a mechanism to combine individual IoT Event Definitions into more complex events. It is similar to the IoT Event Expressions except that it references IoT Event Definitions instead of resources. This mechanism may keep the individual IoT Event Definitions simple and flexible but allow for extending the events into more complex conditions.

In embodiments where complex events are created with the Complex Event Generator 604, the underlying triggering conditions of the individual event definitions may be used for the complex event triggers. In addition, the Complex Trigger Priorities resource 606 may provide a mechanism to specify the priorities given to the event definitions. Similar to the Triggering Priorities 506, the Complex Trigger Priorities 606 may provide a way to specify the IoT Event Definition that may trigger the evaluation of the complex event.

Once an event triggers, processing may be passed to a Notification Handler 404 that may determine how a notification should be processed. For example, a notification may be handled by sending an alert to a specified URI (which may be done automatically by the IoT Event Object 400 for all error messages generated), sending a request or command to a resource, and/or storing the event as a virtual resource.

Where an alert is sent to a specified URI, a message may be processed to notify the resource specified by the URI of the result of the event being triggered. Additional information may be configured to provide a more detailed description of what triggered the event, the date and time stamp of the occurrence, and/or any other custom descriptions. In the embodiment where the notification message was a result of an error, an error code and a description of the error may be included in the notify message.

Where a request or command is sent to a resource, the Notification Handler 404 may send a request or command to another resource in response to an event occurrence. Such an embodiment may be used for certain applications that require immediate action if something were to fail. For example, the brakes on a train could be applied automatically if sensors on the railroad crossing ahead detect the presence of a car or person.

Where the event is stored as a virtual resource, it may be addressed like an actual resource. This embodiment may be used to combine the state of various resources into one resource to simplify monitoring. This embodiment may be useful for cascading events in which the trigger of one event triggers a second event.

Note that each embodiment of handling notifications by a Notification Handler 404 may be enabled and run in parallel with each other. For example, multiple notification handler options may be used upon the detection of a gas leak in a house, where a notification message is sent to both the homeowner and the gas company and a command is sent to disable the main electric breaker of the house.

IoT device capabilities may vary from small, very constrained devices with limited resources to larger devices with more resources. As such, an IoT Event Object 400 may be tailored to particular devices or device types based on the device's or device type's capabilities. For example, only basic operands and operators with limited trigger mechanisms may be supported in very constrained devices, while extended operands and operators may be supported in devices having more resources.

The Object Info resource 408 may provide information about the functionalities of the IoT Event Object 400 a device supports. This Object Info resource 408 may serve the purpose of advertising to other devices, gateways, proxies, or servers the supported events that may operate on the device. This Object Info resource 408 may include the type of supported operands and operators, the supported triggering mechanisms and priorities, the supported control states of the events, whether complex events are supported, and the supported notification handlers.

Figure 7:
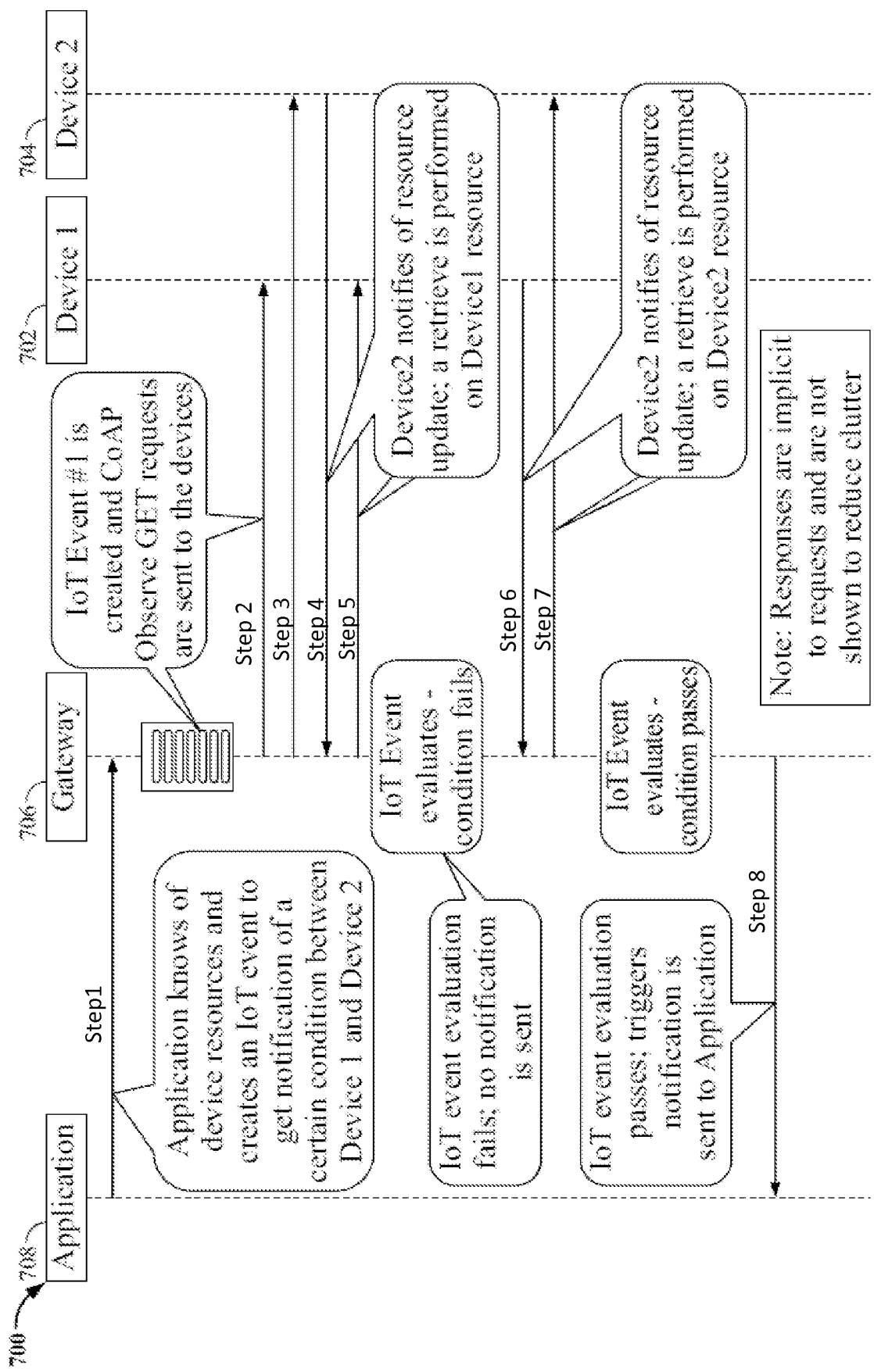
FIG. 7 is a diagram that illustrates an exemplary non-limiting signal flow with CoAP Observe triggering.

FIG. 7 is a diagram that illustrates an exemplary non-limiting signal flow 700 in which a CoAP Observe triggering is utilized. An application may want to get notified if a certain condition exists between Device1 702 and Device2 704.

In steps 1 of FIG. 7, the application may create an IoT Event Object 400 on a Gateway 706 to which the devices are registered.

In steps 2-3 of FIG. 7, The Trigger Conditions may be set up for using CoAP Observe of external resources. As a result, the Gateway 706 may send CoAP Observe requests to the devices.

In step 4 of FIG. 7, after some time, Device2 704 may provide a notification of an update to its resource.

In step 5 of FIG. 7, the IoT Event Object 400 may in turn retrieve Device1's resource and evaluate the event expression. In the illustrated example, the evaluation fails and no notification is sent.

In step 6 of FIG. 7, some time passes before Device1 702 sends an update of its resource.

In step 7 of FIG. 7, this may result in the Gateway retrieving Device2's resource to evaluate the event expression.

In step 8 of FIG. 7, this time, the event evaluation is successful and a notification is sent to the application 708.

Figure 14A:
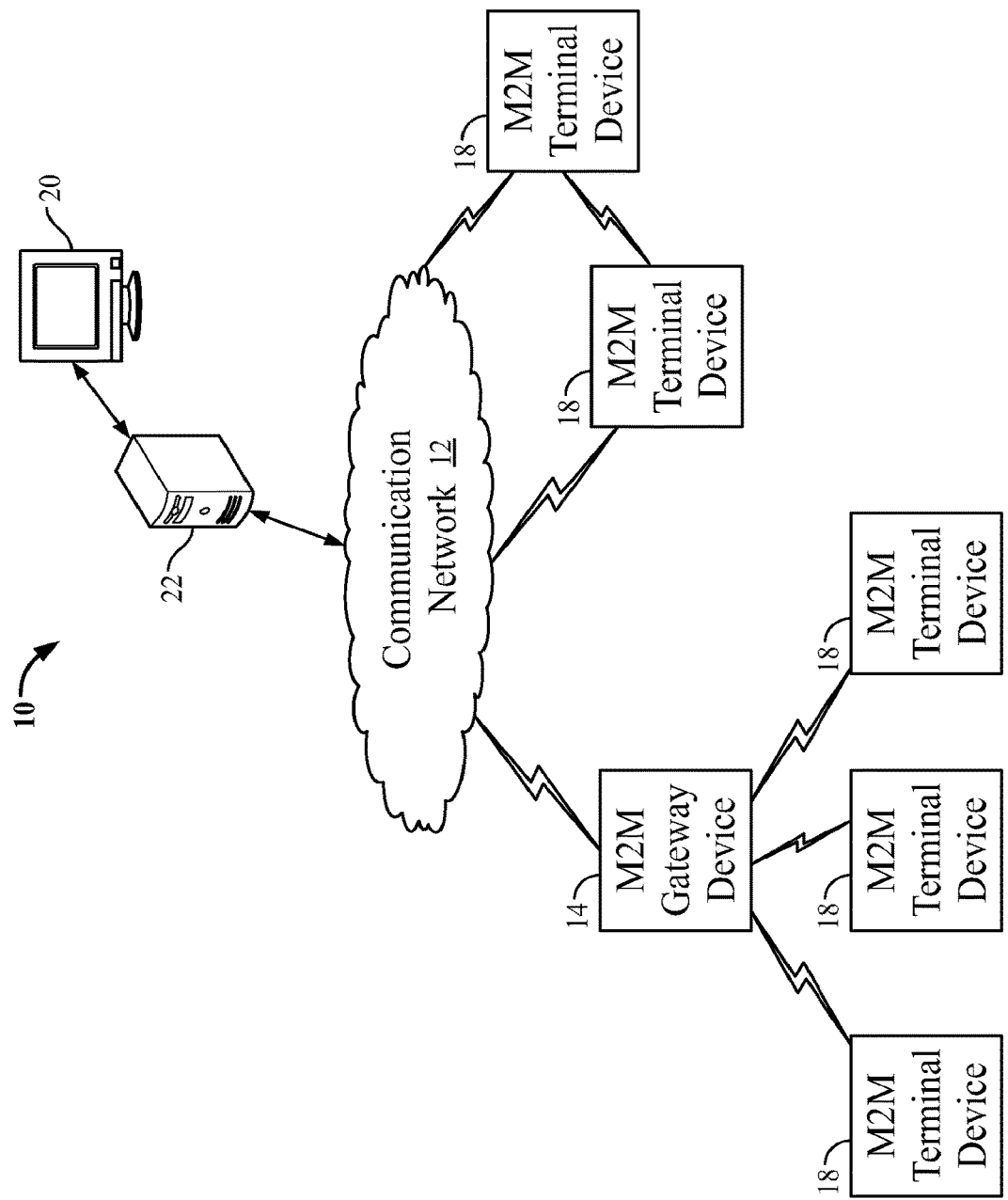
FIG. 14A is a diagram of an example machine-to machine (M2M) or Internet of Things (IoT) communication system 10 in which one or more disclosed embodiments of IoT event management systems and methods may be implemented.
Figure 14B:
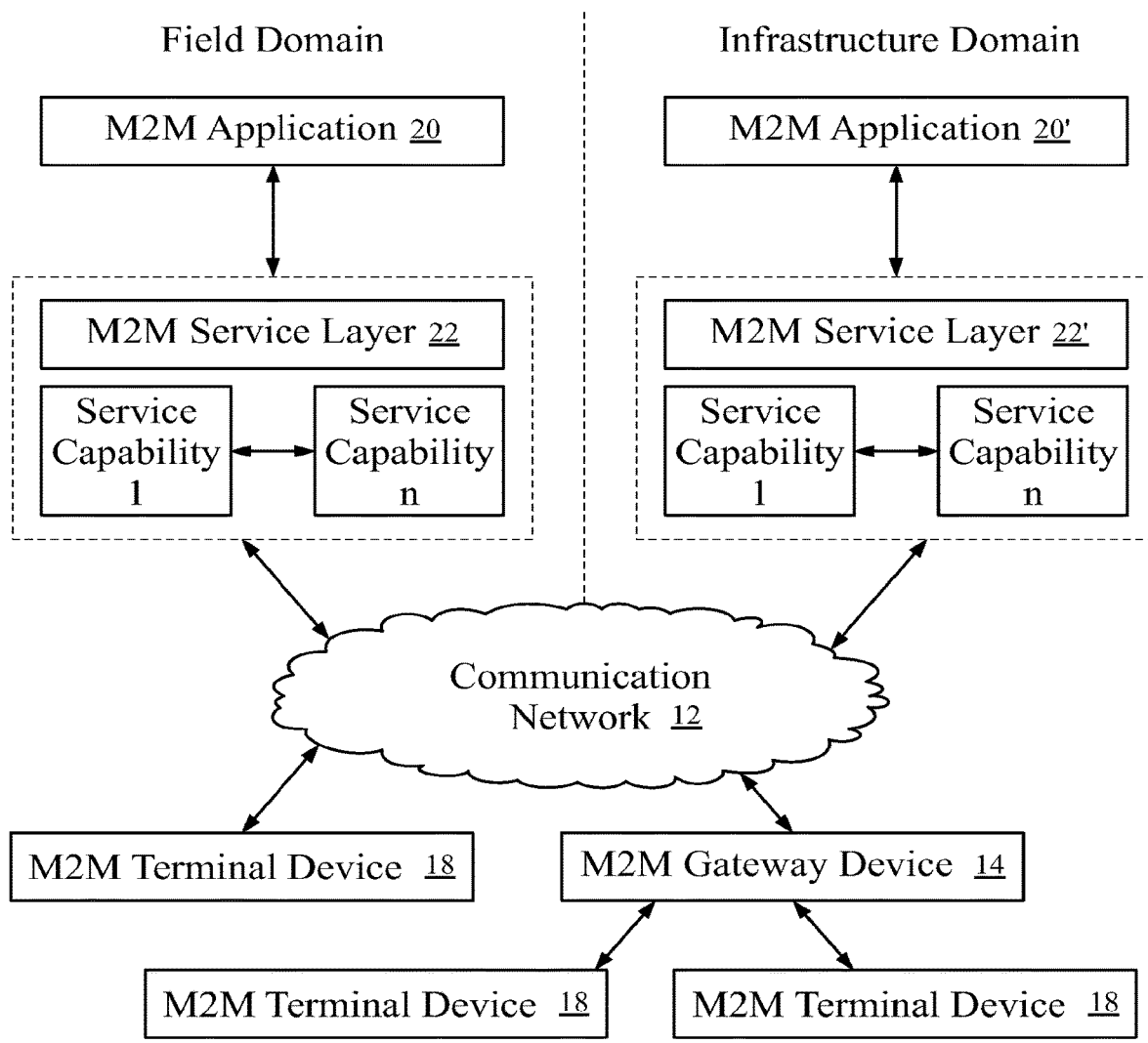
FIG. 14B is a system diagram of an example architecture that may be used within the M2M/IoT communications system illustrated in FIG. 14A.
Figure 14C:
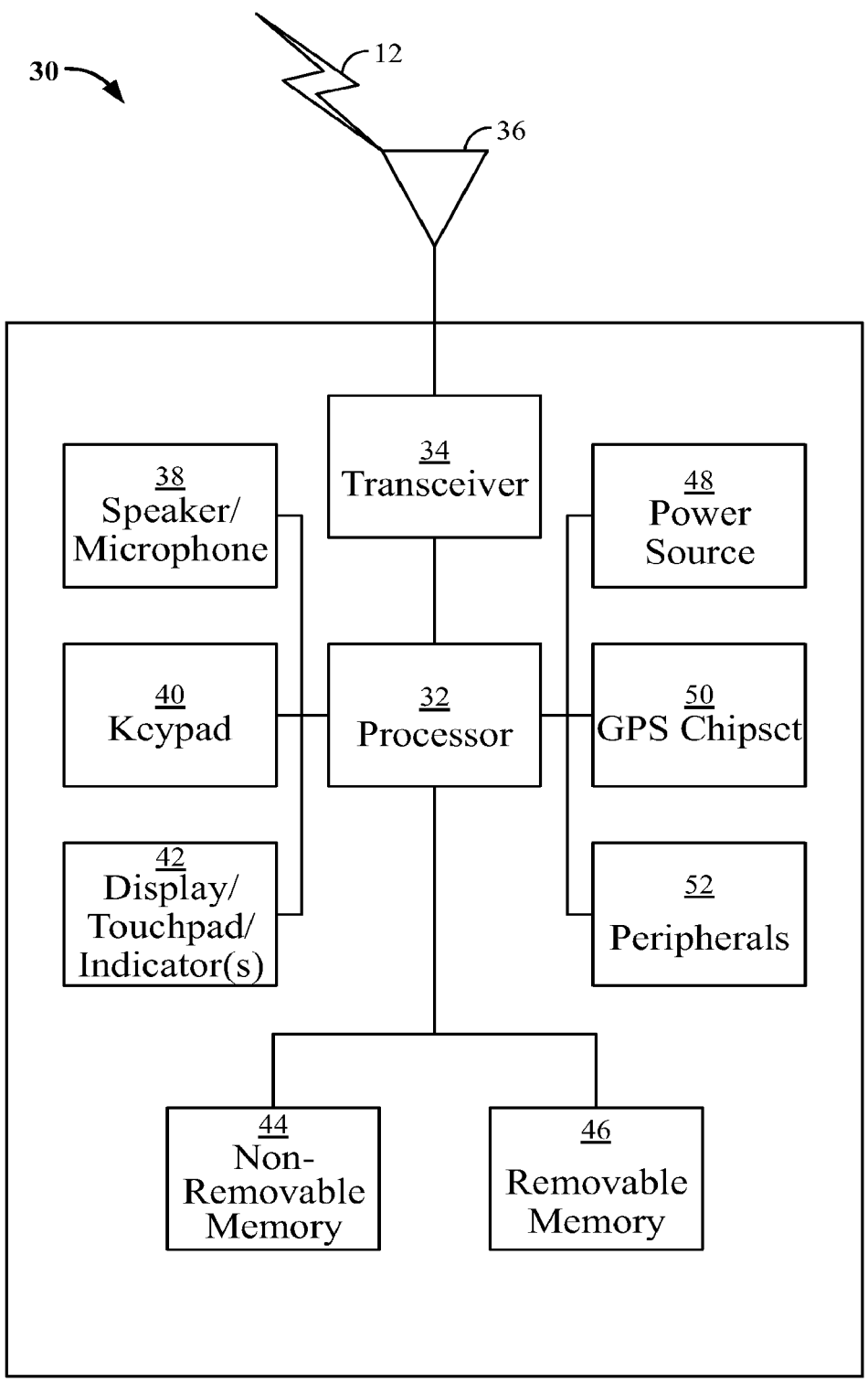
FIG. 14C is a system diagram of an example M2M/IoT terminal or gateway device that may be used within the communications system illustrated in FIG. 14A.
Figure 14D:
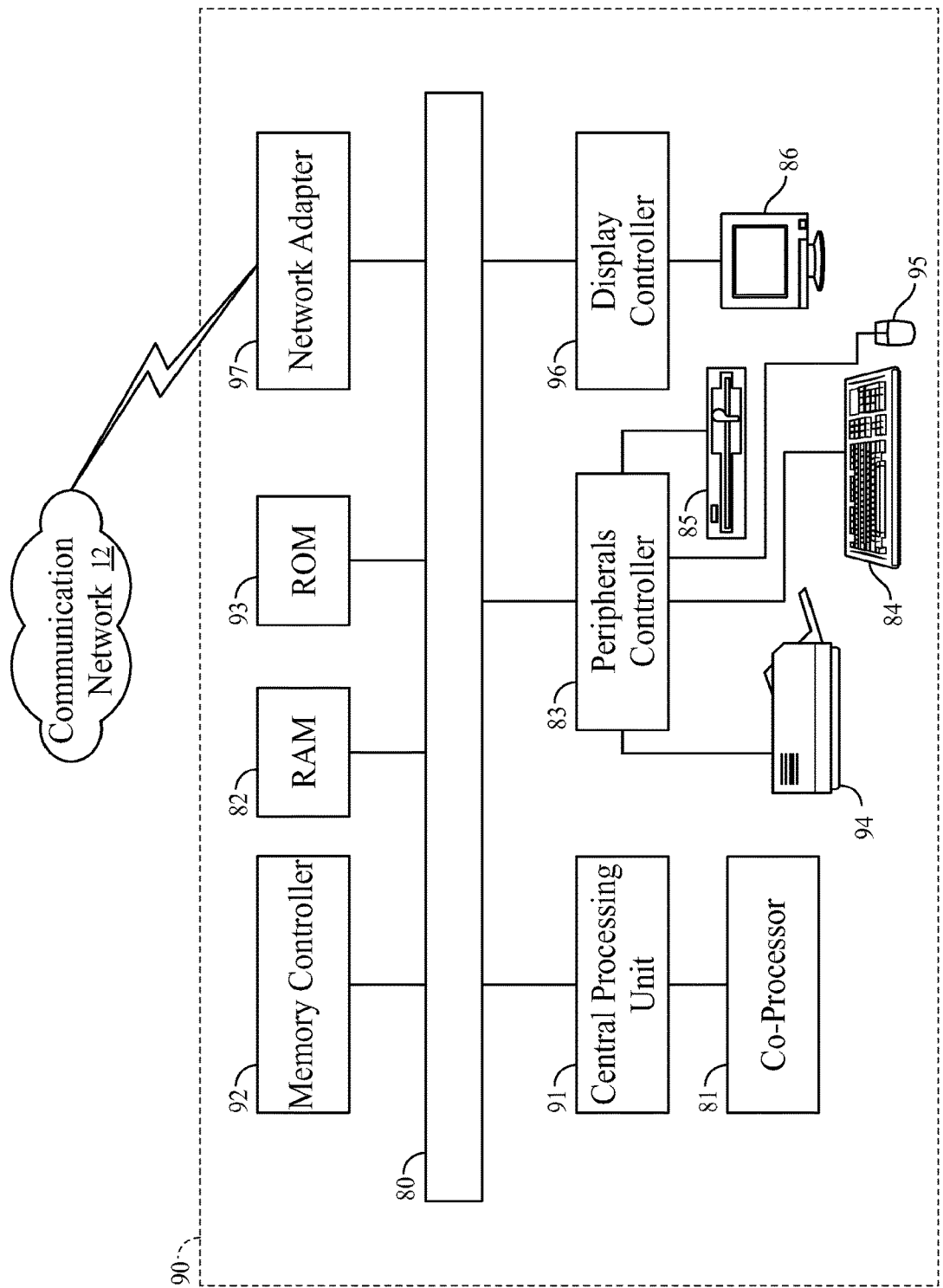
FIG. 14D is a block diagram of an example computing system in which aspects of the communication system of FIG. 14A may be embodied.

It is understood that the entities performing the steps illustrated in FIG. 7 are logical entities that may be implemented in the form of software (i.e., computer-executable instructions) stored in a memory of, and executing on a processor of, a device, server, or other computer system such as one of those illustrated in FIG. 14C or 14D. That is, the method(s) illustrated in FIG. 7 may be implemented in the form of software (i.e., computer-executable instructions) stored in a memory of a computing device, such as for example the device or computer system illustrated in FIG. 14C or 14D, which computer executable instructions, when executed by a processor of the computing device, perform the steps illustrated in FIG. 7.

In an embodiment, an IoT Event Object 400 may be used within the Open Mobile Alliance (OMA) Lightweight M2M (LWM2M) architecture. A LWM2M device may provide sensor measurements for temperature, humidity, light, and presence. The device may provide these sensor readings to a LWM2M Server. An application connected to the LWM2M Server may be used to monitor the readings and turn on an air conditioning unit if the sensor readings indicate the room is hot.

Figure 8:
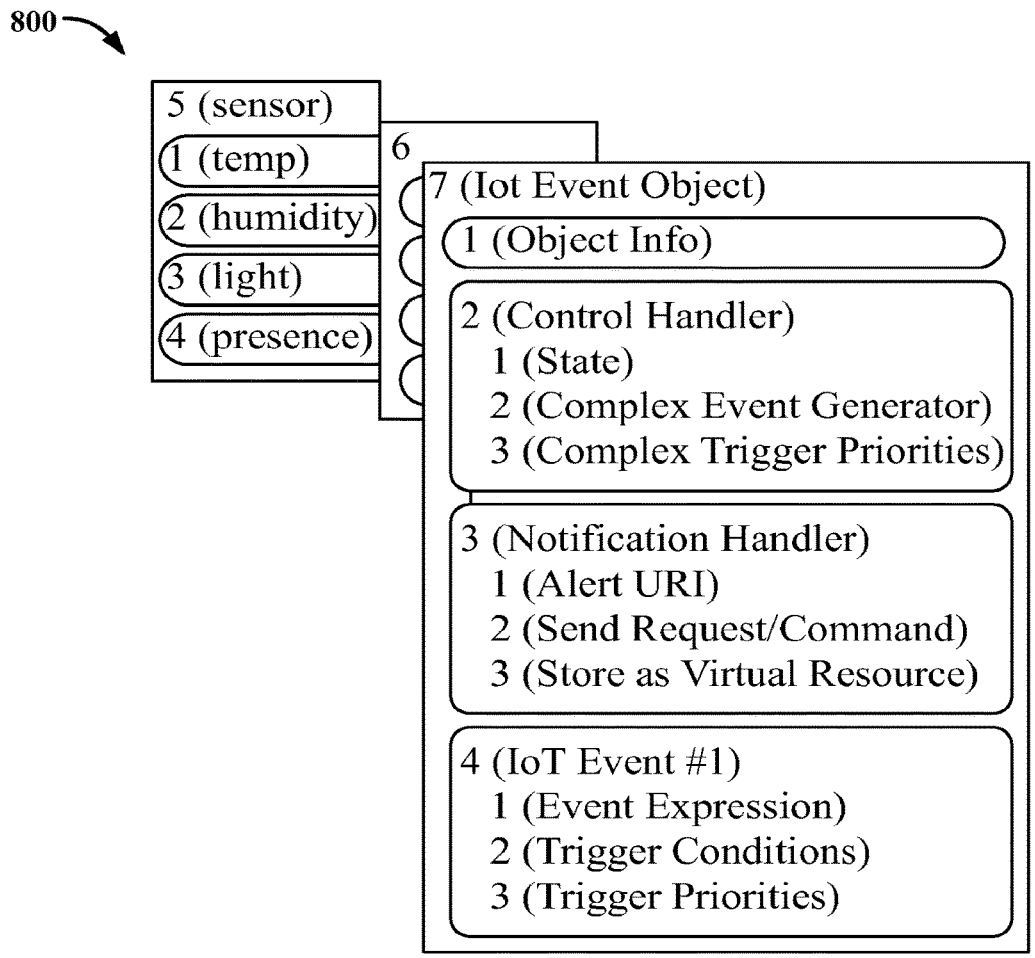
FIG. 8 is a diagram that illustrates an exemplary object including some object resources on an LWM2M device.

Rather than providing the raw sensor readings to the LWM2M Server and requiring the application to process them all, an IoT Event Object may be created to only provide a notification whenever the room is hot. FIG. 8 shows object 800 including some object resources on the LWM2M device. In this figure, object 5 may provide the sensor readings and object 7 may be the IoT Event Object. For example, object 800 may be configured as follows:

7/1=<Information of what IoT Event Object functionalities the device supports>
7/2/1=On, continuous
7/3/1=<URI of the LWM2M Server where notification is to be sent>
7/4/1={(/5/1>75) and (/5/2>80) and (/5/4=1)}
7/4/2=internal resource reference 7/4/3=no priorities selected All other resources are not applicable This exemplary configuration specifies that if the temperature is greater than 75 degrees and the humidity is greater than 80% and the presence sensor detects a person is in the room, an event will be triggered. Once the event triggers, a notification may be sent to a LWM2M Server. Future event definitions may be created in parallel with IoT Event #1 to provide notifications for a different event.

Figure 9:
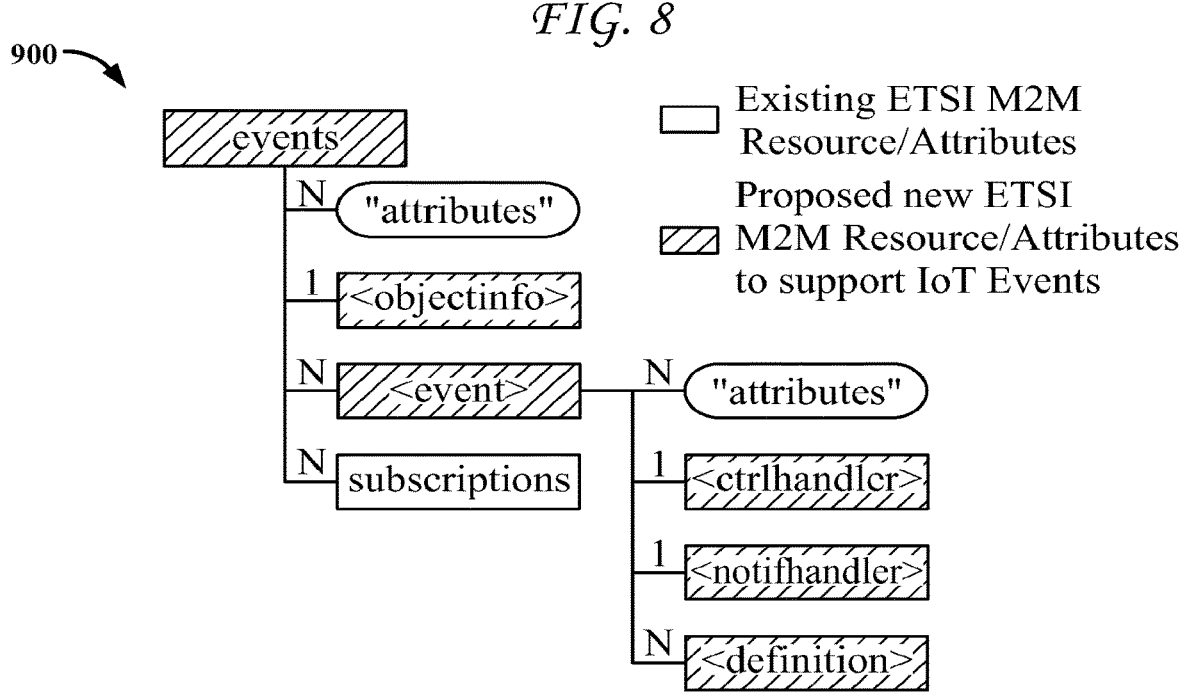
FIG. 9 is a diagram of an exemplary resource tree for a European Telecommunications Standards Institute (ETSI) M2M embodiment of a IoT Event Object.

A European Telecommunications Standards Institute (ETSI) M2M embodiment of the IoT Event Object is shown in FIG. 9 and resource tree 900. In an embodiment, ETSI resources and attributes are provided to support IoT Event Object functionalities. These resources and attributes may have a similar structure to that presented in the OMA LWM2M embodiment. In this embodiment, the Service Capability Layer (SCL) may implement the underlying operations that are performed by the IoT Event Object. Resources on the SCL may be categorized as internal or external resources depending on the how integrated the IoT Event Object is to the SCL. Note that such embodiments may be applied to the OneM2M architecture as well.

Figure 10:
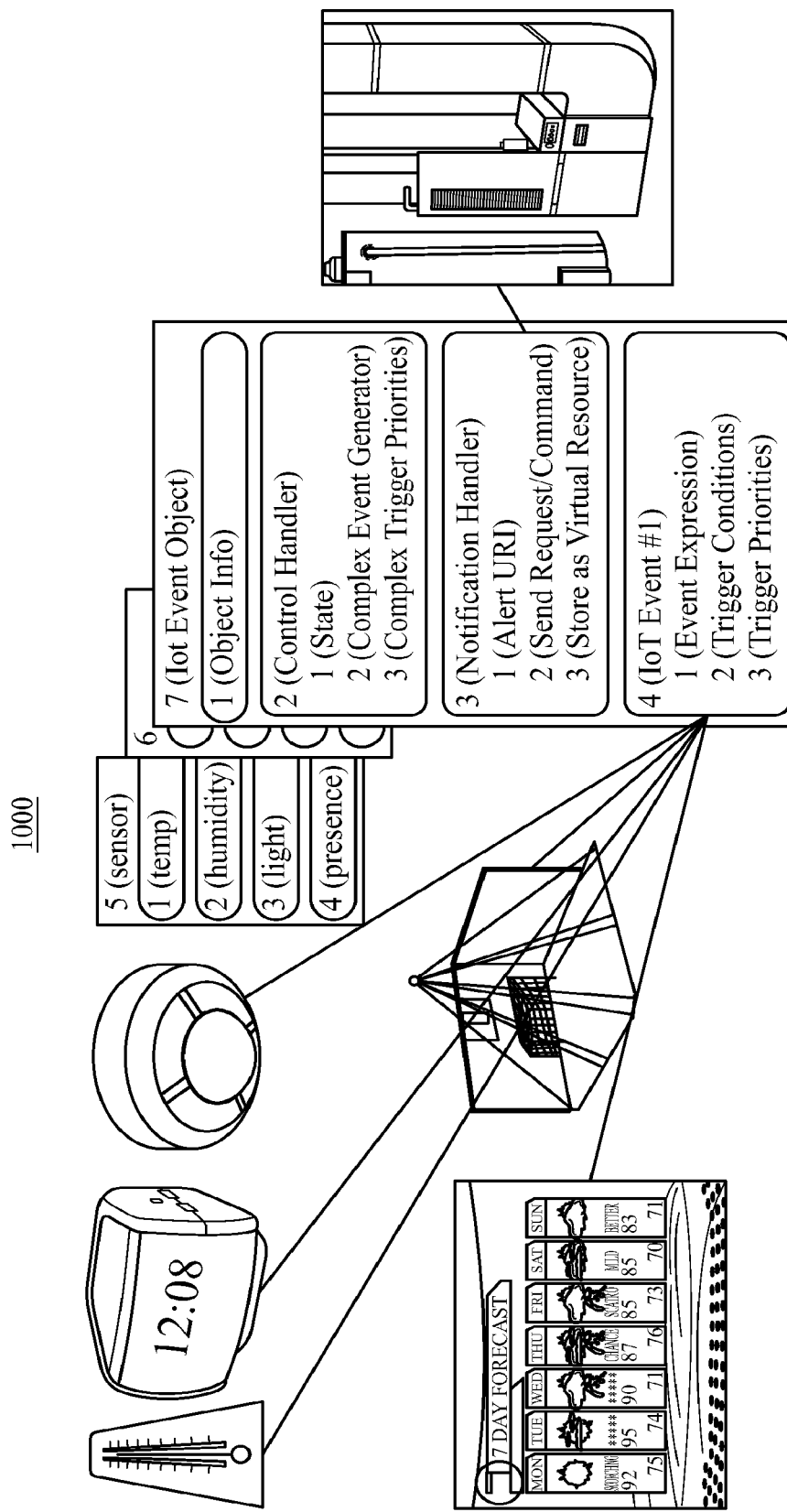
FIG. 10 is a diagram that illustrates an exemplary use of an IoT Event Object to control a HVAC system.

Using the resources shown in FIG. 9, an event or multiple events may be created to control a HVAC system based on temperature, humidity and presence sensors as well as the area forecast and the date and time as shown in FIG. 10 and exemplary non-limiting system 1000. Example IoT Event configurations are provided below:

event1/definition1/expression=(/sclBase/applications/app)/containers/temp/contentInstances/latest>75)—note that the event may have a subscription to get notifications on latest temperature reading event1/definition1/triggerCondition=reference URI event1/definition1/triggerPriority=no priorities selected event1/definition2/expression=(/sclBase/applications/app1/containers/presence/contentInstances/latest=1)—note that the event may have a subscription to get notifications on latest presence sensor reading event1/definition2/triggerCondition=reference URI event1/definition2/triggerPriority=no priorities selected event1/definition3/expression=(if [http://www.weather-.com/weather/today/<area_info>] is {high>90, low>80, humidity>80, sunny})—note that this is an example of a semantic expression in which the weather forecast is checked if the high temperature is greater than 90 degrees, the low temperature is greater than 80 degrees, the humidity is greater than 80%, and there are sunny skies; only if all four conditions are met will the expression evaluate to true event1/definition3/triggerCondition=on demand retrieve event1/definition3/triggerPriority=no priorities selected event1/ctrlHandler/state=On, continuous event1/ctrlHandler/cmplxEventGen=definition1 and definition2 and definition3—note that this is a complex event in which definitions 1, 2, and 3 all need to be evaluated true for the event to trigger event1/ctrlHandler/cmplxTriggerPriority=definition1 or definition2—note that this complex event has a priority trigger in which only definitions 1 or 2 will trigger the evaluation of the event; upon either event occurring, an on demand retrieve of the remaining definitions are performed event1/notifHandler/command=<command to turn on HVAC resource> event2/definition1/expression=(/sclBase/applications/app1/containers/humidity/contentInstances/latest>50)—note that this event has a subscription to get notifications on latest humidity reading event2/definition1/triggerCondition=reference URI event2/definition1/triggerPriority=no priorities selected event2/definition2/expression=(current date is between Jul. 1, 2013 and Jul. 14, 2013)—note that this is a semantic expression that specifies a two week period that the event is active event2/definition2/triggerCondition=timer based resource event2/definition2/triggerPriority=no priorities selected event2/ctrlHandler/state=On, timer based event2/ctrlHandler/cmplxEventGen=definition1 and definition2 event2/ctrlHandler/cmplxTriggerPriority=definition1 and definition2 event2/notifHandler/command=<command to turn on HVAC resource>

In this embodiment, two events are created that are independent of each other but related in functionality. Event 1 provides for normal operations and may use data from the presence and temperature sensors as well as the weather forecast to control the HVAC system. Event 2 may only take effect if the humidity goes above a certain threshold during the two week period from Jul. 1, 2013 and Jul. 14, 2013 (e.g., when the users of this particular system are on vacation). Further events may be created to find the optimal balance between comfort and energy savings.

Figure 11A:
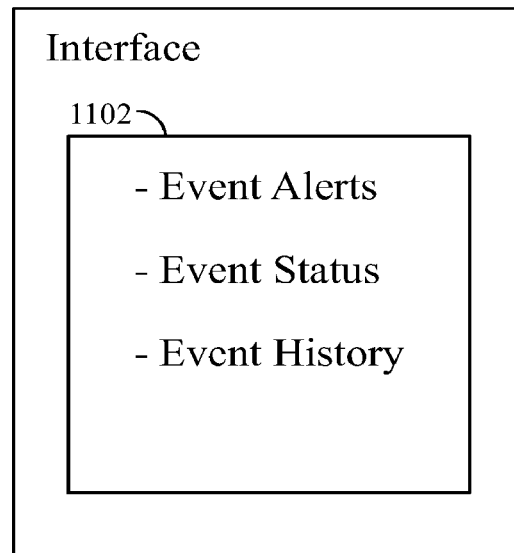
FIG. 11A is a diagram that illustrates an exemplary interface that can be used with the disclosed IoT Event Management systems and methods.
Figure 11B:
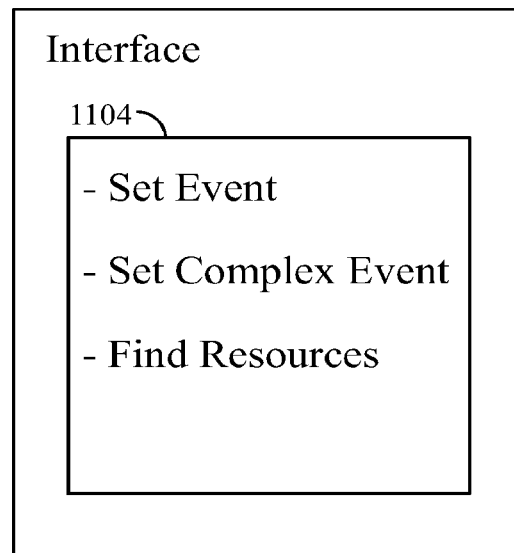
FIG. 11B is another diagram that illustrates an exemplary interface that can be used with the disclosed IoT Event Management systems and methods.

FIGS. 11A-B are diagrams that illustrate exemplary interfaces that can be used with the disclosed IoT Event Management Systems and methods. FIG. 11A illustrates an interface 1102 that can be used to display event notifications/event alerts, event status information such as a list of events, resource values related to the events, and event history such as information about when events were set, a history of event alerts and the like. FIG. 11B illustrates an interface 1104 that can be used to set events and complex events including constructing such events as wells as to find resources to set events.

FIG. 12 is a diagram of an exemplary device 1202 that implements IoT Event Management 1204 with an IoT Event Object 400. The device can be an IoT device or other device.

The IoT Event Management 1204 on device 1202 can be part of a service layer. For example, oneM2M defines the capabilities supported by the oneM2M Service Layer. The oneM2M Service Layer is instantiated as a Capability Services Entity (CSE) which comprises a set of Capability Service Functions (CSF). FIG. 13 is a diagram of an exemplary embodiment with IoT event management 1204 including an IoT Event object 400 hosted in a CSE 1302 as an oneM2M CSF 1304.

FIG. 14A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc. Communication system 10 can be used to implement functionality of the disclosed embodiments and can include functionality and logical entities such as the IoT Event Management 1204, IoT Event Object 400, IoT Event Definition 402, Control handler 406, Notification Handler 404 and logical entities to produce the user interfaces shown in FIGS. 11A and 11B.

As shown in FIG. 14A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 14A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 14B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as IoT event Management 1204, IoT Event Object 400, IoT Event Definition 402, Control handler 406, Notification Handler 404 and logical entities to produce the user interfaces shown in FIGS. 11A and 11B. The M2M service layer 22 may be implemented by one or more servers, computers, devices, virtual machines (e.g. cloud/storage farms, etc.) or the like, including for example the devices illustrated in FIGS. 14C and 14D described below. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc. Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g. cloud/compute/storage farms, etc.) or the like.

Referring also to FIG. 14B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide. The connection methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may include the applications that interact with capillary devices and therefore may be used in conjunction with the disclosed systems and methods. The M2M applications 20 and 20' may include the applications that interact with the UE or gateway and may also be used in conjunction with other disclosed charging systems and methods. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities is provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or as some other component or module of a network, the service layer may be implemented as a logical entity (e.g., software, computer-executable instructions, and the like) executing either on one or more stand-alone servers, computers, or other computing devices or nodes in the network or as part of one or more existing servers, computers, or nodes of such network. As an example, a service layer or component thereof may be implemented in the form of software running on a server, computer, or device having the general architecture illustrated in FIG. 14C or FIG. 14D described below.

Further, the logical entities of the present application such as IoT event Management 1204, IoT Event Object 400, IoT Event Definition 402, Control handler 406, Notification Handler 404 and logical entities to produce the user interfaces shown in FIG. 12 can implemented as part of an M2M network that uses a Service Oriented Architecture (SOA) and/or a resource-oriented architecture (ROA) to access services of the present application.

FIG. 14C is a system diagram of an example device 30, that can be an M2M device, user equipment, gateway, UE/GW or any other nodes including nodes of the mobile care network, service layer network application provider, terminal device 18 or an M2M gateway device 14 for example. The device 30 can execute or include logical entities such as IoT event Management 1204, IoT Event Object 400, IoT Event Definition 402, Control handler 406, Notification Handler 404 and logical entities to produce the user interfaces shown in FIGS. 11A and 11B. The device 30 can be part of an M2M network as shown in FIG. 14A-B or part of a non-M2M network. As shown in FIG. 14C, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the device 30 may include any sub-combination of the foregoing elements while remaining consistent with an embodiment. This device may be a device that uses and/or implements the disclosed systems and methods.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 14C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 14 D is a block diagram of an exemplary computing system 90 on which, for example, the M2M service platform 22 of FIGS. 14 A and 14 B may be implemented. Computing system 90 may comprise a computer or server and may be controlled primarily by computer readable instructions, which may be in the form of software, wherever, or by whatever means such software is stored or accessed. Computing system 90 can execute or include logical entities such as IoT event Management 1204, IoT Event Object 400, IoT Event Definition 402, Control handler 406, Notification Handler 404 and logical entities to produce the user interfaces shown in FIGS. 11A and 11B. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process the data used in various embodiments of the disclosed systems.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 14 A and 14 B. In an embodiment, network adaptor 97 may receive and transmit data used by various disclosed systems and methods.

It is understood that any or all of the systems, methods, and processes described herein may be embodied in the form of computer executable instructions (i.e., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as IoT event Management 1204, IoT Event Object 400, IoT Event Definition 402, Control handler 406, Notification Handler 404 and logical entities to produce the user interfaces shown in FIGS. 11A and 11B may be embodied in the form of the computer executable instructions stored on a computer-readable storage medium. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the FIGs., specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method implemented by a service supporting service capabilities through a set of application programming interfaces (APIs) in a network, the method comprising:
    defining an event object, wherein the event object comprises one or more event expressions, wherein each of the one or more event expressions comprises one or more conditions and information indicative of one or more actions to perform when the one or more conditions are met,
        wherein each of the one or more conditions uses a value from at least one resource in the network and comprises one or more of: an operand, an operator, or a threshold value,
        wherein the event object is stored at the service and comprises a state value that indicates how the event is to be evaluated, and
        wherein the service uses the defined event object to monitor an event; and
    based on determining that the event has met the one or more conditions, performing an action of the one or more actions defined in the event object.

2. The method of claim 1, wherein the event object comprises a trigger condition that indicates how to obtain resource data for the one or more event expressions.

3. The method of claim 1, wherein the event object comprises a trigger priority that indicates when to obtain resource data for other resources for the one or more event expressions after the value from the at least one resource is obtained and at least partially meets the one or more conditions of the one or more event expressions.

4. The method of claim 1, wherein the event object comprises object information that indicates event functionalities supported by the service.

5. The method of claim 1, wherein the service is implemented in at least one of: a server, gateway, or other node of the network.

6. The method of claim 1, wherein the at least one resource is located outside the service.

7. The method of claim 1, wherein the one or more event expressions are dynamically created by an application outside the service.

8. A device comprising a processor and a memory storing computer executable instructions which when executed by the processor cause the device to perform functions of an instance of a service of a communication network, the service supports service capabilities through a set of application programming interfaces (APIs), and to:
    define an event object, wherein the event object comprises one or more event expressions, wherein each of the one or more event expressions comprises one or more conditions and information indicative of one or more actions to perform when the one or more conditions are met,
        wherein each of the one or more conditions uses a value from at least one resource in the network and comprises one or more of: an operand, an operator, or a threshold value,
        wherein the event object is stored at the service and comprises a state value that indicates how the event is to be evaluated, and
        wherein the service uses the defined event object to monitor an event; and
    based on determining that the event has met the one or more conditions, perform an action of the one or more actions defined in the event object.

9. The device of claim 8, wherein the event object comprises a trigger condition that indicates how to obtain resource data for the one or more event expressions.

10. The device of claim 8, wherein the event object comprises a trigger priority that indicates when to obtain resource data for other resources for the one or more event expressions after the value from the at least one resource is obtained and at least partially meets the one or more conditions of the one or more event expressions.

11. The device of claim 8, wherein the event object comprises object information that indicates event functionalities supported by the service.

12. The device of claim 8, wherein the service is implemented in at least one of: a server, gateway, or other node of the network.

13. The device of claim 8, wherein the at least one resource is located outside the service.

14. The device of claim 8, wherein the one or more event expressions are dynamically created by an application outside the service.

15. The method of claim 1, wherein the service is provided in a service layer located on top of network protocol stacks for IoT services.

16. The method of claim 15, wherein the service layer is defined according to ETSI/oneM2M standards.

17. The method of claim 1, wherein the at least one resource is a uniquely addressable element in a Resource Oriented Architecture (ROA) having representation that can be manipulated via RESTful methods.

18. The device of claim 8, wherein the service is provided in a service layer located on top of network protocol stacks for IoT services.

19. The device of claim 18, wherein the service layer is defined according to ETSI/oneM2M standards.

20. The device of claim 8, wherein the at least one resource is a uniquely addressable element in a Resource Oriented Architecture (ROA) having representation that can be manipulated via RESTful methods.

* * * * *